(12) United States Patent
Battagin et al.

(10) Patent No.: US 7,657,571 B2
(45) Date of Patent: Feb. 2, 2010

(54) ELECTRONIC DATA SNAPSHOT GENERATOR

(75) Inventors: Daniel C. Battagin, Bellevue, WA (US); Ramakrishnan Natarajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 11/214,676

(22) Filed: Aug. 30, 2005

(65) Prior Publication Data

US 2007/0050416 A1    Mar. 1, 2007

(51) Int. Cl.
G06F 17/30 (2006.01)
G06F 17/00 (2006.01)

(52) U.S. Cl. ...................... 707/200; 715/503
(58) Field of Classification Search .................. 707/200; 715/503

See application file for complete search history.

(56) References Cited

U.S. PATENT DOCUMENTS

| | | | |
|---|---|---|---|
| 5,819,292 A | 10/1998 | Hitz et al. | 707/203 |
| 6,484,186 B1 | 11/2002 | Rungta | 707/203 |
| 6,651,075 B1 | 11/2003 | Kusters et al. | 707/204 |
| 6,892,211 B2 | 5/2005 | Hitz et al. | 707/202 |
| 7,013,312 B2 * | 3/2006 | Bala et al. | 707/200 |
| 2002/0010743 A1 * | 1/2002 | Ryan et al. | 709/205 |
| 2002/0129054 A1 * | 9/2002 | Ferguson et al. | 707/503 |
| 2002/0184131 A1 * | 12/2002 | Gatto | 705/36 |
| 2007/0028159 A1 * | 2/2007 | Ying et al. | 715/503 |

* cited by examiner

*Primary Examiner*—Apu M Mofiz
*Assistant Examiner*—Cindy Nguyen
(74) *Attorney, Agent, or Firm*—Merchant & Gould PC

(57) ABSTRACT

A snapshot of electronic data is generated to provide information about a file at a specific point in time. The snapshot may be shared between several users. The snapshot is generated based on the type of snapshot that is requested. The snapshot types include a static snapshot, a published item snapshot and an interactive snapshot. Each type of snapshot may hide a portion of the file data from requesting users such that sensitive information is not made available to the users. The static snapshot is generated by saving only static data associated with the file. The interactive snapshot is generated by saving static data associated with the file, but any links or references to dynamic file data are maintained. The published item snapshot includes specific file objects and static data associated with the specified objects.

12 Claims, 8 Drawing Sheets

ELECTRONIC DATA SNAPSHOT GENERATOR

BACKGROUND

Electronic document sharing allows different users to easily access the same document. Many different users may access and modify the same document simultaneously. Simultaneous modification can be confusing to subsequent users who request the document because the most current version of the document may not reflect all user modifications. Data values in the document may change over time. Thus, previous versions of the document with the old data values may be desirable but not available. A shared document may also include proprietary information. For example, the shared document may include sensitive financial data, trade secrets, or other confidential information. An organization may not wish to share such information to all users who may access the shared document.

SUMMARY

A snapshot of electronic data is generated to provide information about a file at a specific point in time. The snapshot may be shared between several users. The snapshot is generated based on the type of snapshot that is requested. The snapshot types include a static snapshot, a published item snapshot and an interactive snapshot. Each type of snapshot may hide a portion of the file data from requesting users such that sensitive information is not made available to the users. The static snapshot is generated by saving only static data associated with the file. Any dynamic data associated with the file such as metadata is not saved in the static snapshot. Examples of dynamic data include formulas and references to external data sources. The interactive snapshot is generated by saving static data associated with the file. However, the interactive snapshot maintains links and references to dynamic file data. Thus, values linked to dynamic data may be manually refreshed with current values in the interactive snapshot. The published item snapshot includes specific file objects and static data associated with the specified objects.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION

Figure 1:
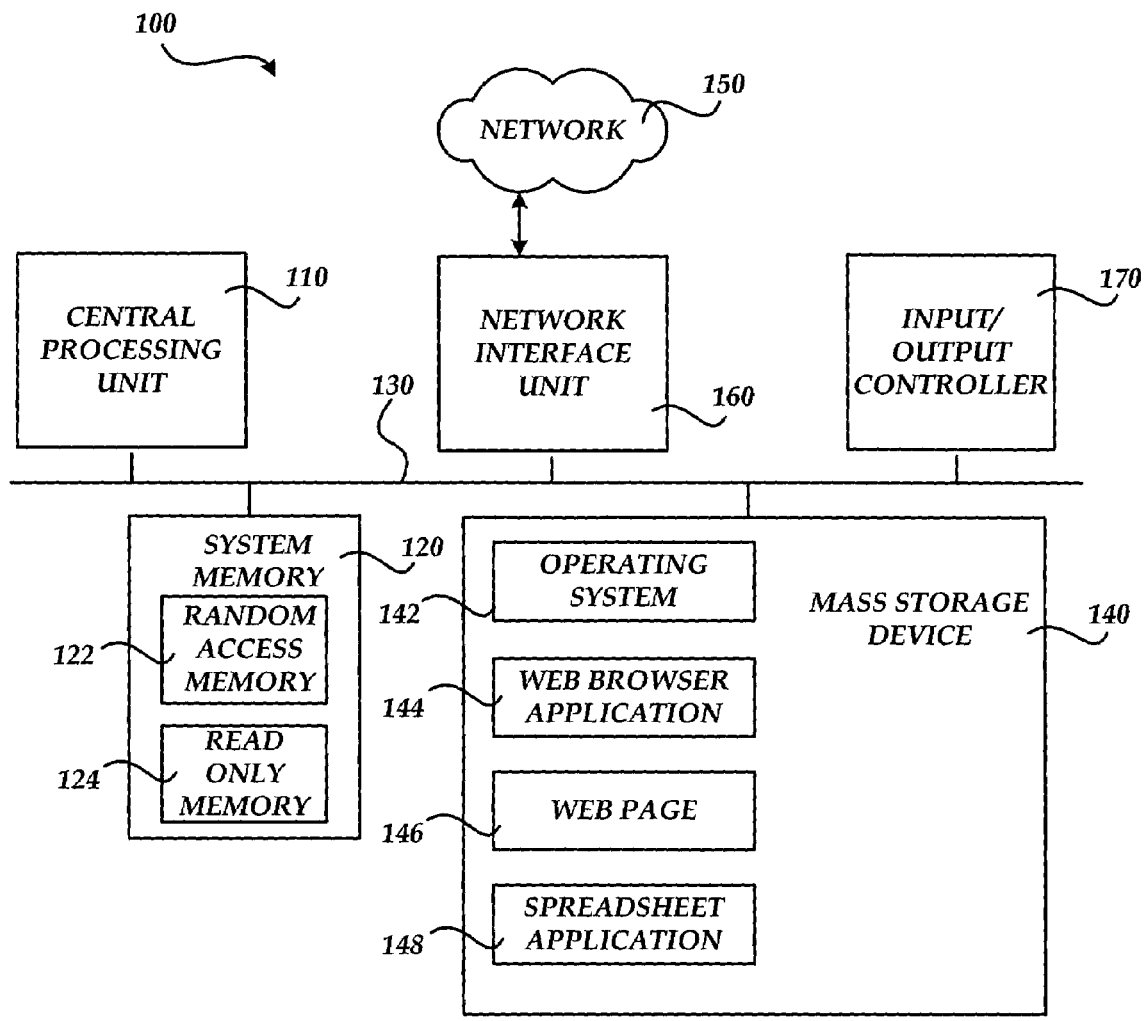
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute on server and personal computer systems, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments of the invention will be described. The computer architecture shown in FIG. 1 illustrates a conventional desktop or laptop computer, including a central processing unit 110 ("CPU"), a system memory 120, including a random access memory ("RAM") 122 and a read-only memory ("ROM") 124, and a system bus 130 that couples the memory to the CPU 110. A basic input/output system containing the basic routines that help to transfer information between elements within the computer, such as during startup, is stored in the ROM 124. The computer 100 further includes a mass storage device 140 for storing an operating system 142, application programs, and other program modules, which will be described in greater detail below.

The mass storage device 140 is connected to the CPU 110 through a mass storage controller (not shown) connected to the bus 130. The mass storage device 140 and its associated computer-readable media provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments of the invention, the computer 100 may operate in a networked environment using logical connections to remote computers through a network 150, such as the Internet. The computer 100 may connect to the network 150 through a network interface unit 160 connected to the bus 130. It should be appreciated that the network interface unit 160 may also be utilized to connect to other types of networks and remote computer systems. The computer 100 may also include an input/output controller 170 for receiving and processing input from a number of other devices, including a keyboard, mouse, or electronic stylus (not shown in FIG. 1). Similarly, the input/output controller 170 may provide output to a display screen, a printer, or other type of output device.

As mentioned briefly above, a number of program modules and data files may be stored in the mass storage device 140 and RAM 122 of the computer 100, including the operating system 142 that is suitable for controlling the operation of a networked personal computer, such as the WINDOWS XP operating system from MICROSOFT CORPORATION of Redmond, Wash. The mass storage device 140 and the RAM 122 may also store one or more program modules. In particular, the mass storage device 140 and the RAM 122 may store a Web browser application program 144. As known to those skilled in the art, the Web browser application program 144 is operative to request, receive, render, and provide interactivity with electronic documents, such as a Web page 146 that has been formatted using HTML. According to one embodiment of the invention, the Web browser application program 144 comprises the INTERNET EXPLORER Web browser application program from MICROSOFT CORPORATION. It should be appreciated, however, that other Web browser application programs from other manufacturers may be utilized to embody the various aspects of the present invention, such as the FIREFOX Web browser application from the MOZILLA FOUNDATION.

As will be described in greater detail below, the Web page 146 may comprise a viewable representation of a snapshot of a spreadsheet document from a spreadsheet application program 148. The spreadsheet application program 148 may comprise the EXCEL spreadsheet application program from MICROSOFT CORPORATION or another spreadsheet application program from another manufacturer. Additional details regarding the process for generating a snapshot of a spreadsheet document are be provided below with respect to FIGS. 2-8.

Figure 2:
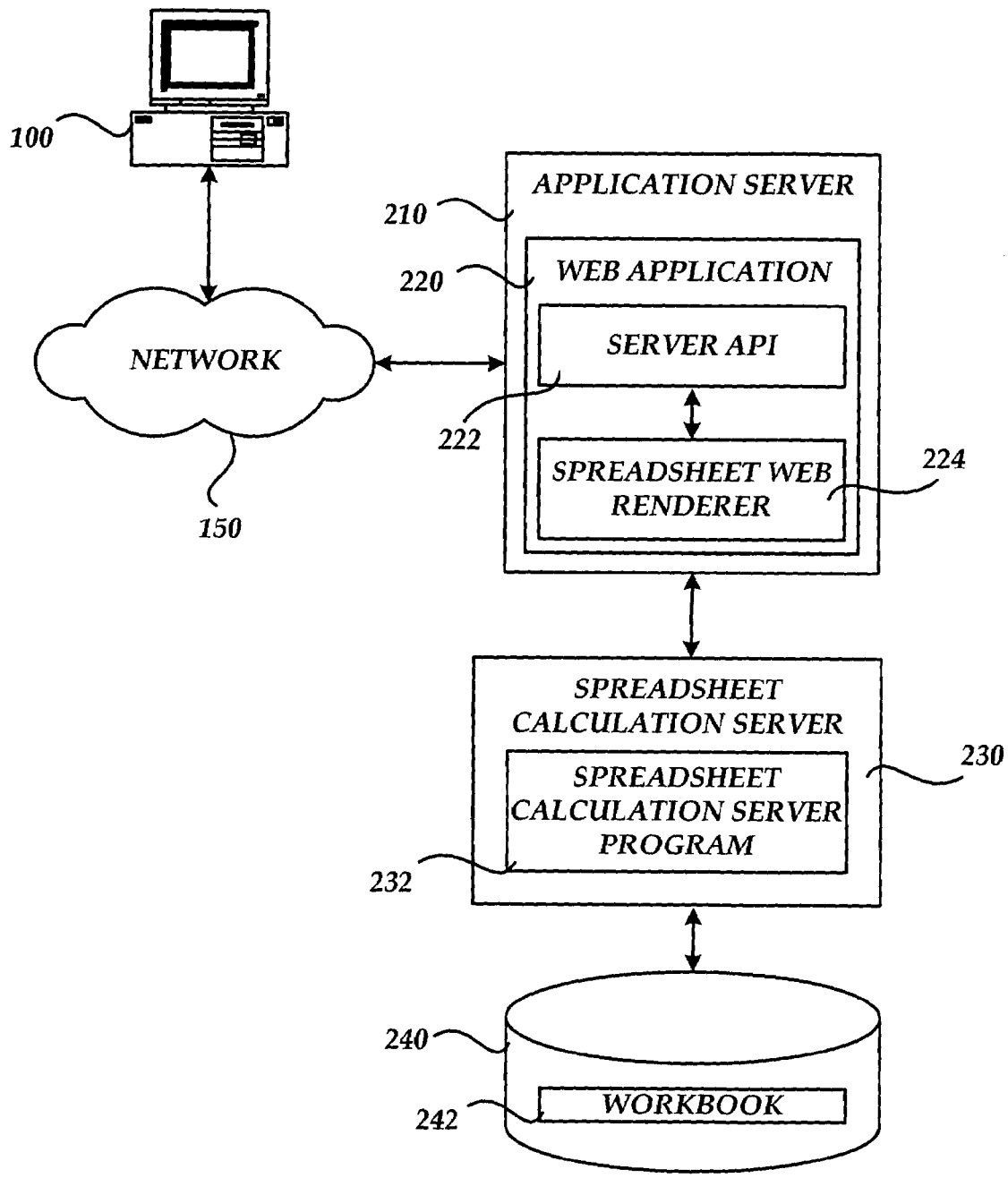
FIG. 2 is a network architecture diagram illustrating an illustrative operating environment for embodiments of the invention.

Referring now to FIG. 2, a network architecture diagram will be described that illustrates an operating environment for the various embodiments of the invention. As shown in FIG. 2, the computer 100 is connected to the network 150. Also connected to the network 150 is an application server 210. The application server 210 comprises a server computer which may contain some or all the conventional computing components described above with respect to FIG. 1. Additionally, the application server 210 is operative to execute a Web server application for receiving and responding to requests for documents stored at or accessible to the application server 210. Moreover, the application server 210 is operative to receive and respond to requests for pages generated by a Web application 220. It should be appreciated that the Web application 220 may comprise code executable at the application server 210, executable code for communicating with other computers, and may include templates, graphics, audio files, and other content known to those skilled in the art.

The Web application 220 is operative to provide an interface to a user of the computer 100 to view a snapshot of a spreadsheet or a workbook accessible via the network 150. In particular, the Web application 220 utilizes a server application programming interface ("API") 222. According to this embodiment of the invention, the server API 222 is operative to enable communication with a spreadsheet calculation server 230. The spreadsheet calculation server 230 is operative to execute a spreadsheet calculation server program 232. The spreadsheet calculation server program 232 comprises an executable program for retrieving and calculating snapshots of spreadsheets, such as a workbook 242 stored in a data store 240. It should be appreciated that in the embodiments of the invention described herein, the spreadsheet calculation server 230 may include many of the conventional hardware and software components discussed above with respect to FIG. 1.

The computer 100 may transmit a request to the application server 210 for a snapshot of the workbook 242 within the context of the Web browser application 144. In response to such a request, the Web application 220 communicates with the spreadsheet calculation server 230 through the server API 222. In particular, the Web application 220 requests from the spreadsheet calculation server 230 the appropriate snapshot of the workbook 242.

The spreadsheet calculation server program 232 generates the snapshot of the workbook 242 by loading the appropriate workbook 242 from the data store 240 and processing the workbook 242 depending on the type of snapshot that is requested, as discussed in detail below. The types of snapshots include a static snapshot, a dynamic snapshot, and a published item snapshot. The spreadsheet calculation server program 232 converts the snapshot of the workbook 242 into a format that is suitable for expressing the contents of a spreadsheet. In one embodiment, the snapshot of the workbook is converted into an EXCEL file format. Once the spreadsheet calculation server program 232 has converted the requested snapshot of the workbook 242 to a suitable format, the formatted file is returned to the Web application 220. The application server 210 forwards the formatted file to the client 100 via network 150. The formatted file is stored at the client 100 and may be accessed through an appropriate application program.

A snapshot provides information about a file (e.g., a workbook) at a specific point in time such that a user may access the snapshot at a later date to identify the file data as it existed when the snapshot was created. The owner of a workbook may identify different types of snapshots that are presented to requesting users. The different types of snapshots include the static snapshot, the dynamic snapshot and the published item snapshot. Each type of snapshot may hide a portion of the workbook data from the requesting user. The hidden data may include proprietary information that the owner does not wish to share with the requesting users.

The workbook may include different objects (e.g., a table, a pivot table, a cell, a range of cells, a chart, etc.). An object of the workbook may be associated with a displayed value and metadata associated with the value (e.g., for formatting). In one embodiment, the metadata may correspond to dynamic data such as a formula to generate values or a reference to an external data source.

Figure 3:
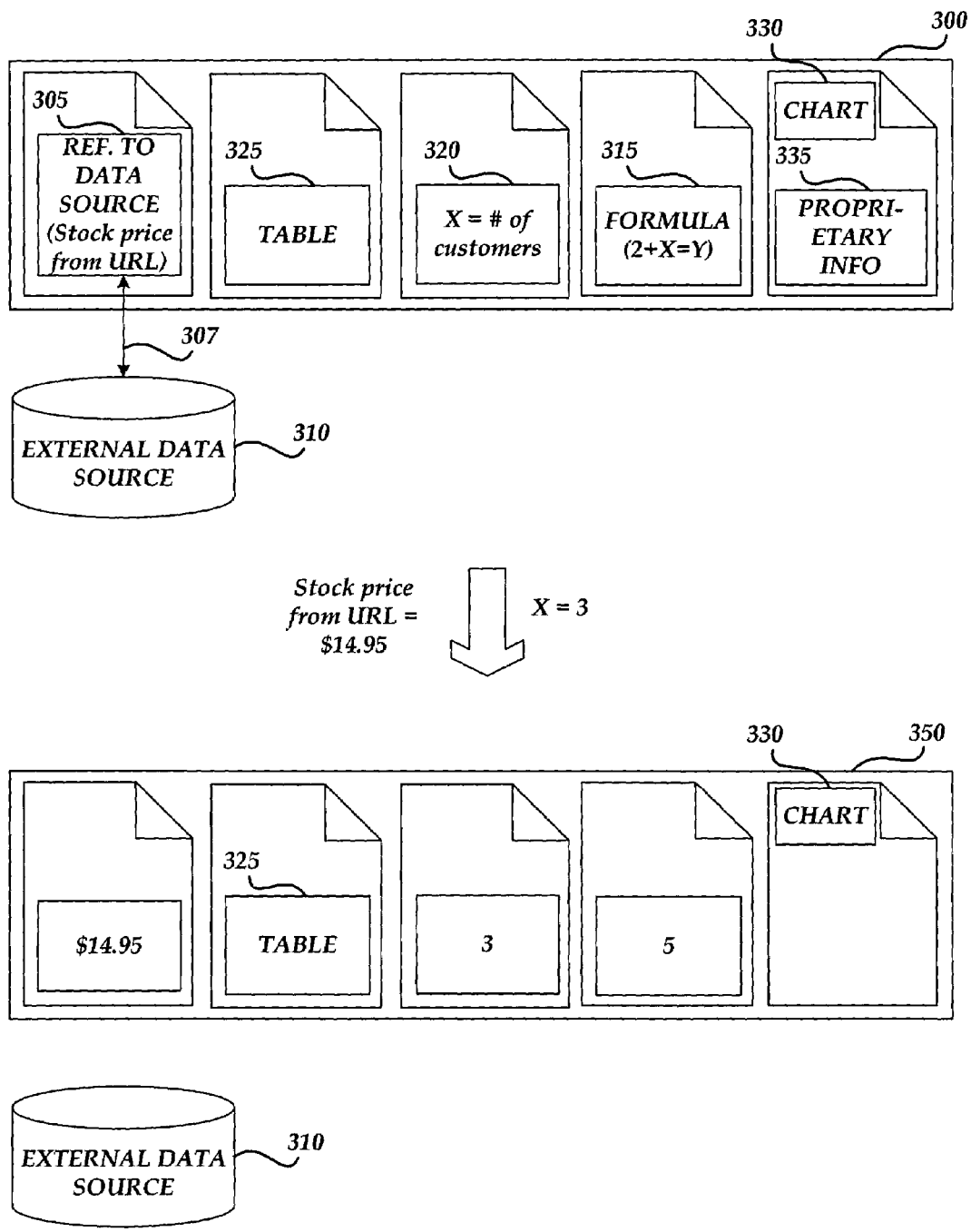
FIG. 3 is a functional block diagram illustrating a workbook and a corresponding static snapshot.

FIG. 3 illustrates a workbook and a corresponding static snapshot. The workbook 300 includes data that may be spread across several sheets. One sheet may include a reference 305 to an external data source 310. For example, the reference 305 may provide a link 307 to a URL that includes current stock price information. The workbook 300 may also include a formula 315 that is used to calculate a value (e.g., Y). The formula 315 may be dependent on a variable 320. For example, the formula 315 may use a variable that identifies a number of customers. Thus, the value of the formula 315 changes when the value of the variable 320 changes. The workbook 300 may also include objects such as a table 325 and a chart 330. Some of the workbook data may include proprietary information 335. Examples of proprietary information include comments, revision marks, deleted text, personal information, e-mail headers, routing slips, user names, ink annotations, and file paths. In one embodiment, the proprietary information may be associated with a formula. For example, a formula may provide a complicated calculation model that the owner does not wish to share with requesting users. In another embodiment, the proprietary information is associated with the external data source 310. For example, the external data source 310 may identify server names, connection strings, queries, credentials, etc. that the owner does not wish to share with requesting users.

The static snapshot 350 is generated by saving only static object information associated with the workbook 300 at a specific point in time and removing any dynamic workbook data. Examples of static object information may include the table 325 and the chart 330. The static snapshot 350 ensures that all users who access the static snapshot 350 see the same workbook data. The static snapshot 350 may be generated in the same file format as the workbook 300. Formatting associated with workbook objects may also be saved with the static snapshot. The proprietary information 335 is not included in the static snapshot 350. Any metadata associated with workbook objects is also not included in the static snapshot 350.

The static object information may be generated by computing values from formula calculations expressed in the workbook. Formulas constitute dynamic workbook data and are not saved in the static snapshot. Rather, only the values resulting from formula calculations are saved. For example, when the snapshot is generated the number of customers is three (i.e., X=3). The value of the formula is calculated (i.e., Y=5) and saved based on existing conditions when the snapshot is generated.

The static object information may also be generated by refreshing any external data that is referenced in the workbook. For example, when the static snapshot 350 is generated, the referenced stock price that is refreshed from the external data source 310 is $14.95. The value of the stock price when the snapshot is generated is saved in the static snapshot (i.e., $14.95). The value is then dissociated from the external data sources 310 (e.g., by removing the link 307). Thus, the value cannot be subsequently updated and the original source of the value is protected.

Figure 4:
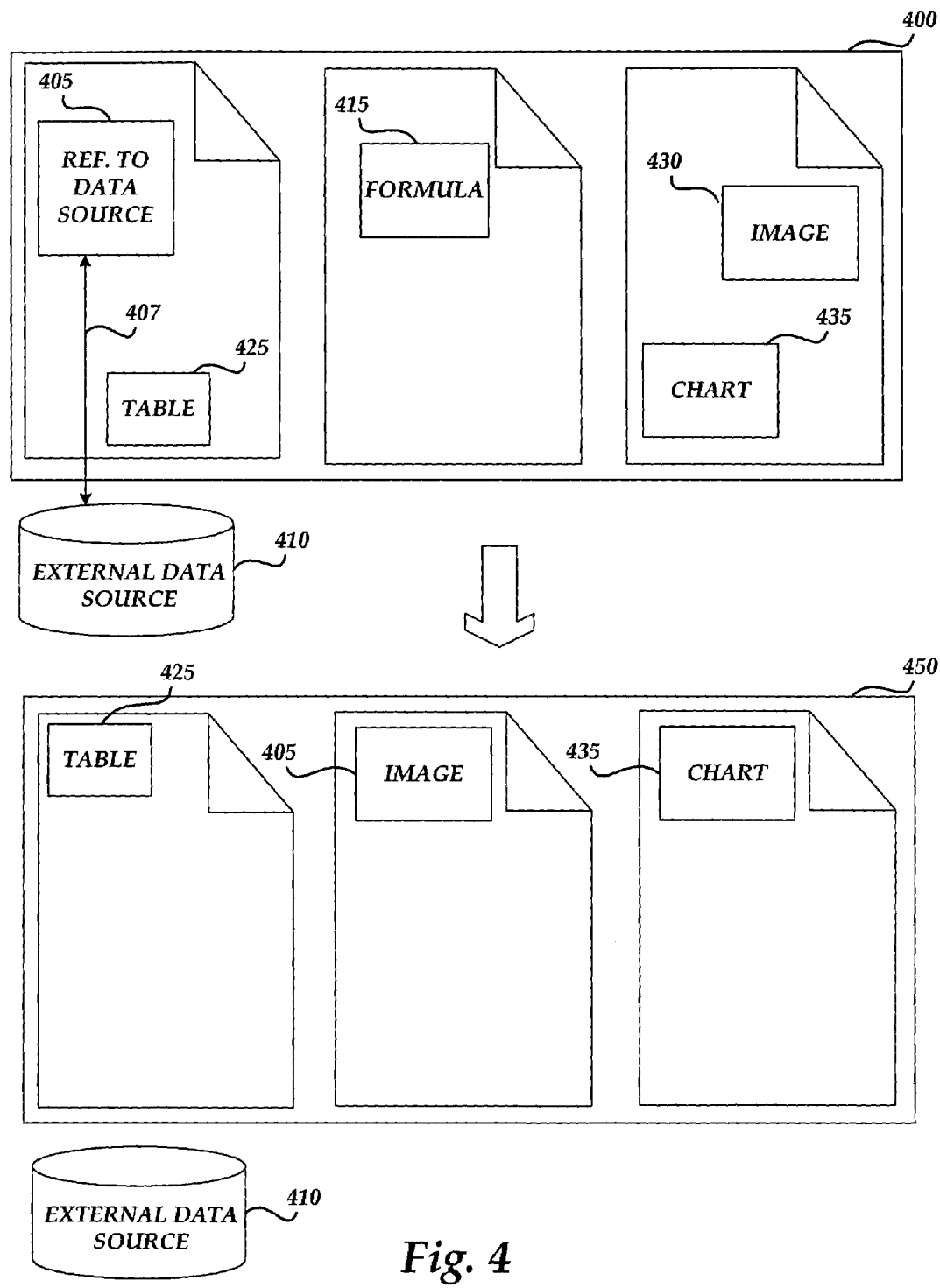
FIG. 4 is a functional block diagram illustrating a workbook and a corresponding published item snapshot.

FIG. 4 illustrates a workbook and a corresponding published item snapshot. The workbook 400 includes data that may be spread across several sheets. One sheet may include a reference 405 to an external data source 410. For example, the reference 405 may provide a link 407 to a URL. The workbook 400 may also include a formula 415 and objects such as a table 425, an image 425 and a chart 330.

The published item snapshot 450 includes specific workbook objects. The workbook owner may specify which objects are included in the published item snapshot 450 and made available to requesting users; unspecified objects are not included in the published item snapshot 450. For example, a workbook owner may select the table 425, the image 430 and the chart 435 to be included on the published item snapshot 450. The published item snapshot 450 is similar to a static snapshot because any references to external data sources are removed. For example, the link 407 to the external data source 410 is removed.

In one embodiment, each object selected for publication is placed on a separate sheet in the published item snapshot 450 to simplify user interaction with the published objects. For example, the image 430 and the chart 435 were included on the same sheet in the workbook 400. When the published item snapshot 450 is generated, the image 430 is included on one sheet and the chart is included on a different sheet. Each sheet may be named to identify the published object included on the sheet.

In another embodiment, each object selected for publication in the published item snapshot 450 is positioned on a sheet such that the published object is easily identified when viewed. For example, the table 425 is positioned on a lower right portion of a sheet in the workbook. When the published item snapshot 450 is generated, the table 425 is positioned near an upper left portion of a sheet in the published item snapshot 450. This feature is useful because spreadsheets can be quite large (e.g. thousands of rows and hundreds of columns). If a published object is reproduced from a position in a workbook sheet that is not in a portion of the sheet that is viewable when the published item snapshot 450 is loaded to a user interface, a user viewing the new sheet generated for the published item snapshot 450 may erroneously assume that the sheet is empty. The sheet would have to be scrolled to locate the published object.

Figure 5:
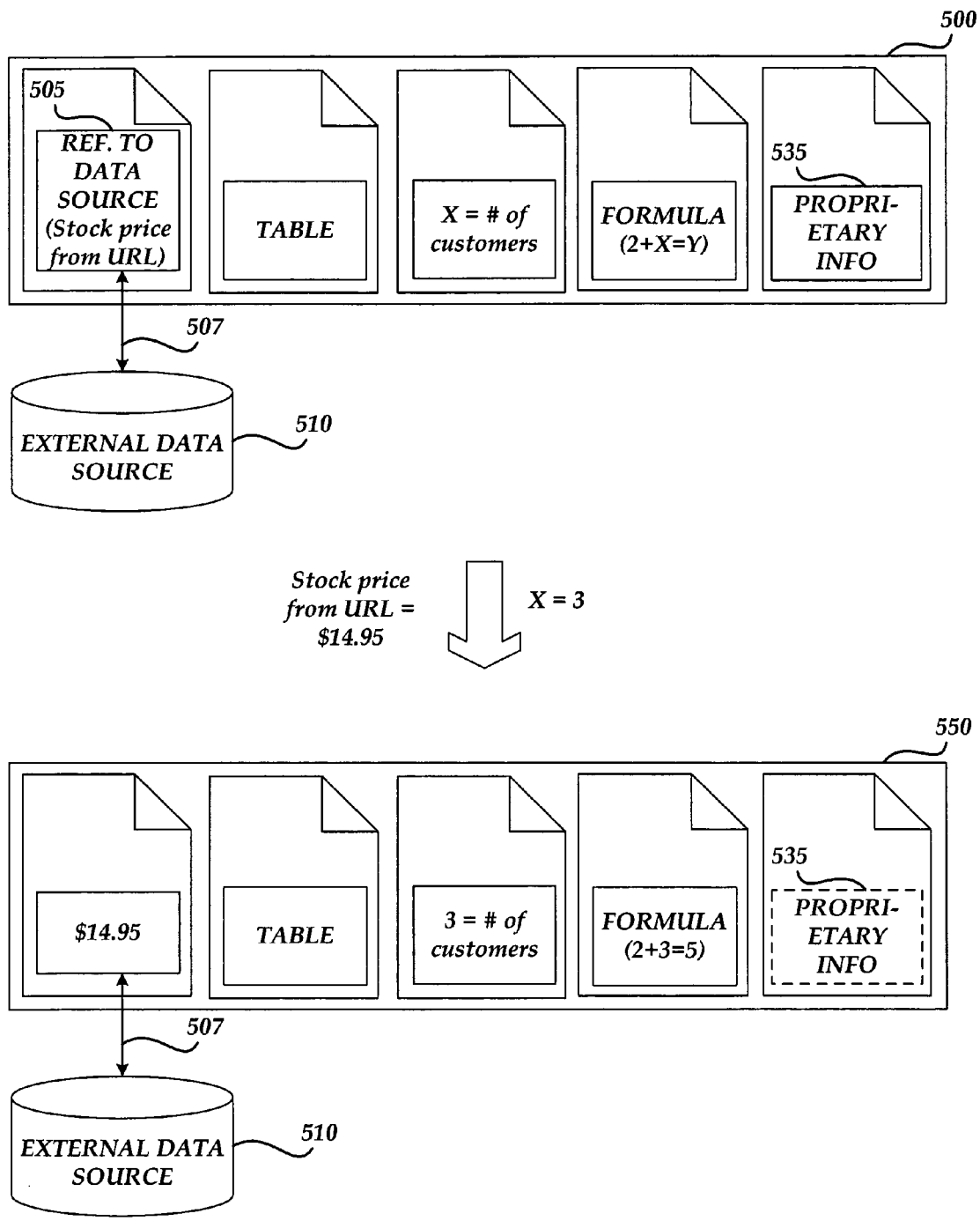
FIG. 5 is a functional block diagram illustrating a workbook and a corresponding interactive snapshot.

FIG. 5 illustrates a workbook and a corresponding interactive snapshot. The interactive snapshot 550 is generated by saving object information associated with the workbook 500 at a specific point in time (e.g., values from formulas, references to external data sources, etc.). The interactive snapshot 550 maintains links to dynamic workbook data including metadata associated with objects in the workbook 500. For example, the interactive snapshot 550 does not dissociate values from formulas in the workbook 500. The interactive snapshot 550 maintains a link 507 from a reference 505 in the workbook 500 to an external data source 510. Comments included in the workbook may also be saved with the interactive snapshot 550. Any proprietary information 535 associated with the workbook 500 is also associated with the interactive snapshot 550, however the proprietary information 535 may be hidden from users requesting the interactive snapshot 550. Any automatic update features associated with the dynamic workbook data are disabled in the interactive snapshot 550 such that values that were stored when the interactive snapshot 550 was generated may be manually refreshed with current values. Thus, a user may refresh the interactive snapshot 550 to view data associated with a current version of the workbook 500. Interactive snapshots may be useful for archiving data records.

Figure 6:
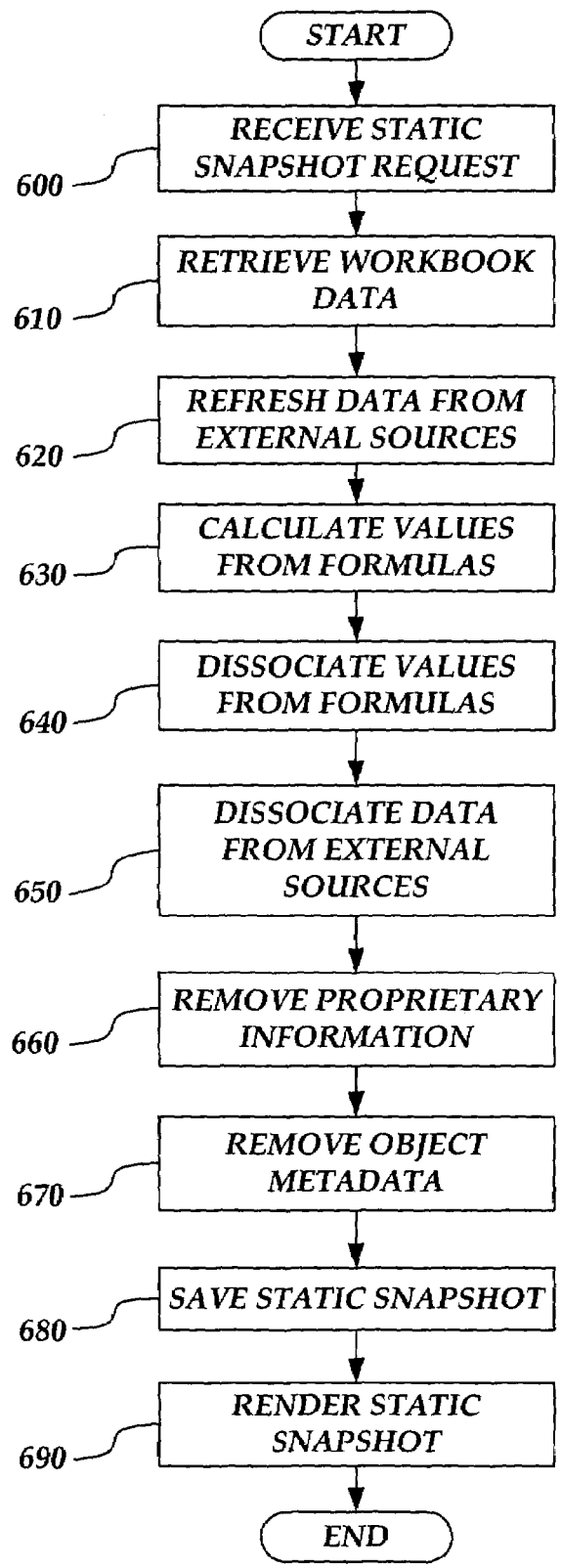
FIG. 6 is a process diagram showing aspects of an illustrative process for generating a static snapshot.
Figure 7:
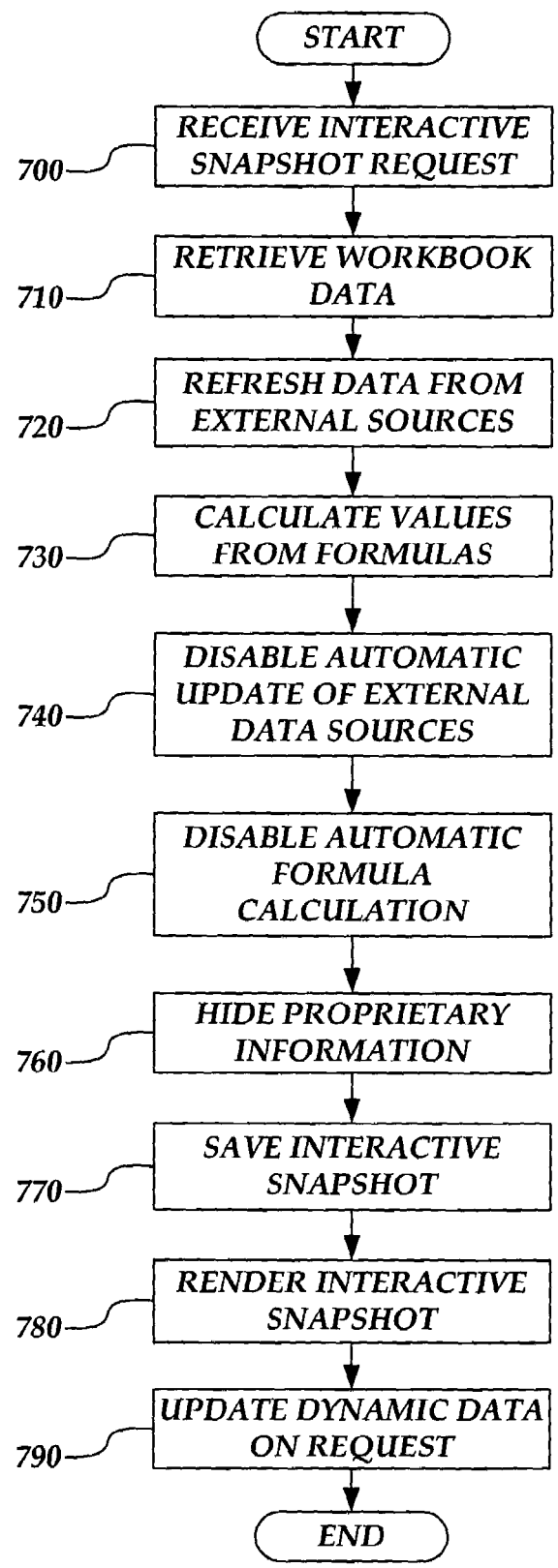
FIG. 7 is a process diagram showing aspects of an illustrative process for generating an interactive snapshot.
Figure 8:
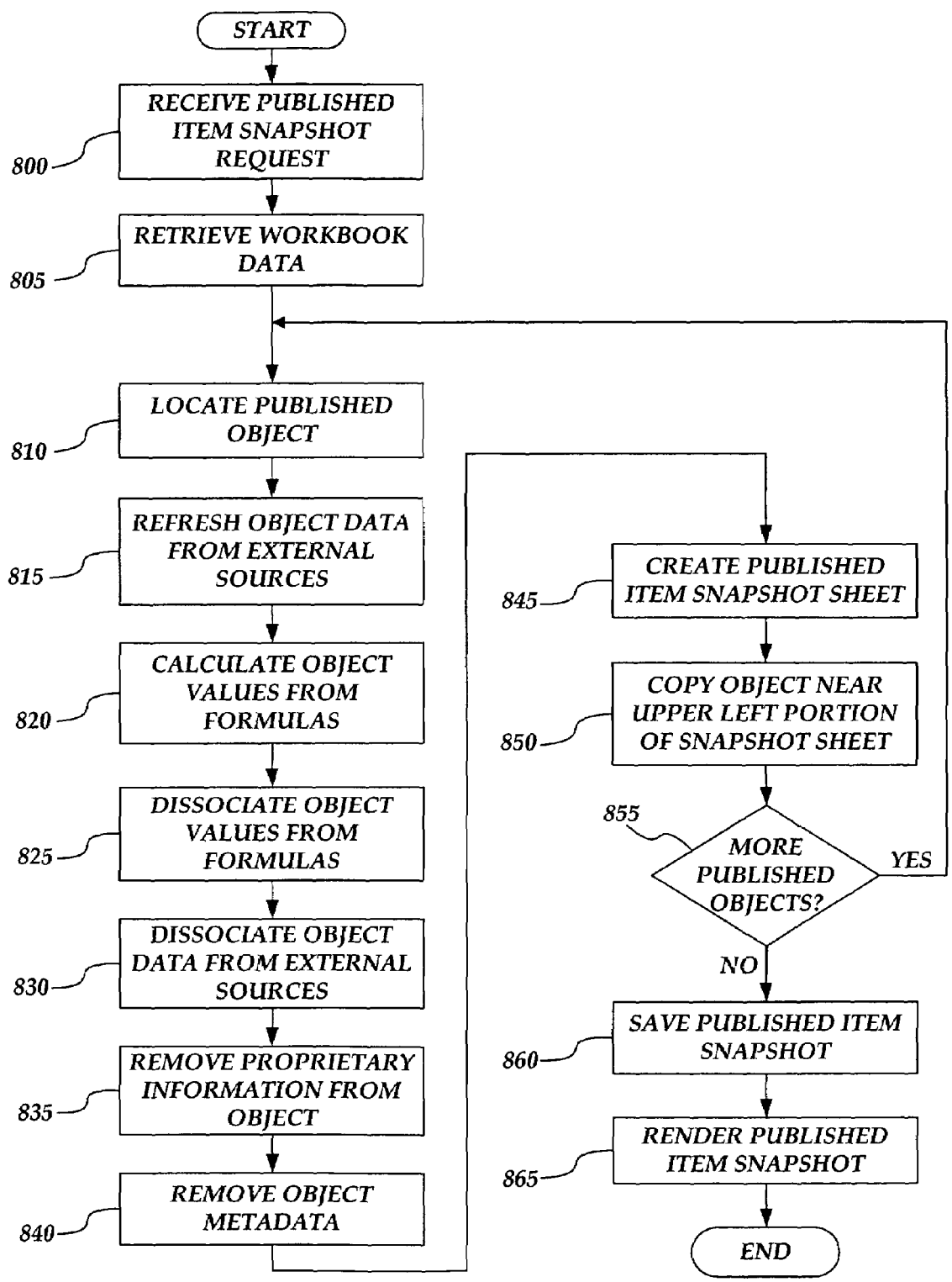
FIG. 8 is a process diagram showing aspects of an illustrative process for generating a published item snapshot.

Referring now to FIGS. 6-8, illustrative routines will be described illustrating a process for generating a snapshot of electronic data. It should be appreciated that although the embodiments of the invention described herein are presented in the context of a spreadsheet application program, the invention may be utilized in other types of application programs that support document sharing. For instance, the embodiments of the invention described herein may be utilized within a word processing application program, a presentation application program, a drawing or computer-aided design application program, or a database application program in order to allow the rendering of and interaction with a document without requiring a dedicated application program.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 6-8, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

FIG. 6 is a process diagram showing aspects of an illustrative process for generating a static snapshot. Processing begins at a start block where an application is loaded on a client. A user initiates the generation of a static snapshot by submitting a static snapshot request at the client.

A spreadsheet calculation server receives the static snapshot request at block 600. The spreadsheet calculation server may receive the static snapshot request directly from the client. Alternatively, the static snapshot request may be sent over a network via a Web application program that is in communication with the spreadsheet calculation server.

Moving to block 610, the spreadsheet calculation server retrieves workbook data associated with the static snapshot request. The workbook data may be retrieved from a data store that is in communication with the spreadsheet calculation server. The workbook data may include different objects (e.g., a table, a cell, a range of cells, a chart, etc.). An object of the workbook may be associated with a displayed value and metadata associated with the value (e.g., for formatting). In one embodiment, the metadata may correspond to dynamic data such as a formula to generate values or a reference to an external data source.

Transitioning to block 620, any workbook data that is linked to external data sources is refreshed. The refreshed data provides the current value when the static snapshot is generated. Proceeding to block 630, any formulas in the workbook data are calculated to generate corresponding values. The generated values are saved in the static snapshot.

Continuing to block 640, any external data references in the workbook data are dissociated from the external data sources. Thus, the external data reference cannot be updated after the static snapshot is generated. Advancing to block 650, the values are dissociated from the formulas such that the values do not change whenever the static snapshot is accessed.

Moving to block 660, any proprietary information in the workbook data is removed. Proprietary information includes the workbook data that the owner of the workbook does not want to share with users who access the static snapshot. Examples of proprietary information include comments, revision marks, deleted text, personal information, e-mail headers, routing slips, user names, ink annotations, and file paths.

Transitioning to block 670, metadata associated with objects in the workbook data is removed. However, any formatting information associated with the objects is retained such that the objects can be displayed in the static snapshot in the same way as in the workbook.

Proceeding to block 680, the static snapshot is saved. The static snapshot provides information about the workbook data at a specific point in time. A portion of the workbook data is not included in the static snapshot such that users who access the static snapshot are prevented from viewing sensitive information.

Continuing to block 690, the spreadsheet application server converts the static snapshot into a format that may be rendered at the client. In one embodiment, the static snapshot is converted to a spreadsheet file format. The file is then rendered at the client. Processing then terminates at an end block.

FIG. 7 is a process diagram showing aspects of an illustrative process for generating an interactive snapshot. Processing begins at a start block where an application is loaded on a client. A user initiates the generation of an interactive snapshot by submitting an interactive snapshot request at the client.

A spreadsheet calculation server receives the interactive snapshot request at block 700. The spreadsheet calculation server may receive the interactive snapshot request directly from the client. Alternatively, the interactive snapshot request may be sent over a network via a Web application program that is in communication with the spreadsheet calculation server.

Moving to block 710, the spreadsheet calculation server retrieves workbook data associated with the interactive snapshot request. The workbook data may be retrieved from a data store that is in communication with the spreadsheet calculation server. The workbook data may include different objects. An object of the workbook may be associated with a displayed value and metadata associated with the value. In one embodiment, the metadata may correspond to dynamic data such as a formula to generate values or a reference to an external data source.

Transitioning to block 720, any workbook data that is linked to external data sources is refreshed. The refreshed data provides the current value when the static snapshot is generated. Unlike the process for generating the static snapshot, metadata associated with objects in the workbook data is retained. For example, the external data references in the workbook are not dissociated from the external data sources. Maintaining a link between external data references and external data sources allows the external data references to be updated in response to user action.

Proceeding to block 730, any formulas in the workbook data are calculated to generate corresponding values. The generated values are saved in the interactive snapshot. However, the generated values are not dissociated from the formulas. Maintaining a link between values and formulas allows the values to be updated in response to user action.

Continuing to block 740, a feature for automatically updating references to external data sources is disabled. Thus, the references to external data sources may only be updated manually. Advancing to block 750, a feature for automatic formula calculation is disabled. Thus, the formulas may only be recalculated in response to a user action.

Moving to block 760, any proprietary information in the workbook data is hidden in the interactive snapshot. Proprietary information includes the workbook data that the owner of the workbook does not want to share with users who access the interactive snapshot. The proprietary information remains associated with the interactive snapshot such that the owner may reveal the proprietary information in the interactive snapshot, or update values associated with the proprietary information.

Transitioning to block 770, the interactive snapshot is saved. The interactive snapshot provides information about the workbook data at a specific point in time. A portion of the workbook data is not included in the interactive snapshot such that users who access the interactive snapshot are prevented from viewing sensitive information. Links are maintained to dynamic data including metadata associated with objects in the workbook. Examples of dynamic data include values and corresponding formulas, and external data references and external data sources. Thus, the interactive snapshot may be manually updated with current data in response to user action.

Proceeding to block 780, the spreadsheet application server converts the interactive snapshot into a format that may be rendered at the client. In one embodiment, the interactive snapshot is converted to a spreadsheet file format. The file is then rendered at the client.

Continuing to block 790, any dynamic workbook data in the interactive snapshot may be updated in response to user action. The user may initiate the update of dynamic data by clicking "refresh" or "update" buttons. The dynamic aspect of interactive snapshots is useful when archiving data. Processing then terminates at an end block.

FIG. 8 is a process diagram showing aspects of an illustrative process for generating a published item snapshot. Processing begins at a start block where an application is loaded on a client. A user initiates the generation of a published item snapshot by submitting a published item snapshot request at the client.

A spreadsheet calculation server receives the published item snapshot request at block 800. The spreadsheet calculation server may receive the published item snapshot request directly from the client. Alternatively, the published item snapshot request may be sent over a network via a Web application program that is in communication with the spreadsheet calculation server.

Moving to block 805, the spreadsheet calculation server retrieves workbook data associated with the published item snapshot request. The workbook data may be retrieved from a data store that is in communication with the spreadsheet calculation server. The workbook data may include different objects (e.g., a table, a pivot table, a cell, a range of cells, a chart, etc.). A portion of the objects is selected for publication in the published item snapshot. An object of the workbook may be associated with a displayed value and metadata associated with the value (e.g., for formatting). In one embodiment, the metadata may correspond to dynamic data such as a formula to generate values or a reference to an external data source.

Transitioning to block 810, the spreadsheet calculation server locates an object selected for publication in the workbook data. Proceeding to block 815, any workbook data in the object that is linked to external data sources is refreshed. The refreshed data provides the current value when the published item snapshot is generated. Continuing to block 820, any formulas in the object are calculated to generate corresponding values. The generated values are saved in the object. Advancing to block 825, the values are dissociated from the formulas such that the values do not change whenever the published item snapshot is accessed. Moving to block 830, any external data references in the object are dissociated from the external data sources. Thus, the external data reference cannot be updated after the published item snapshot is generated.

Transitioning to block 835, any proprietary information in the object is removed. Proprietary information includes the workbook data that the owner of the workbook does not want to share with users who access the published item snapshot. Proceeding to block 840, metadata associated with the object is removed. However, any formatting information associated with the object is retained such that the object can be displayed in the published item snapshot in a way similar to the object displayed in the workbook.

Continuing to block 845, a sheet is created for the object of the published item snapshot. Advancing to block 850, the object is copied to the sheet. The object is positioned on the sheet such that when a user accesses the published item snapshot the object is viewable on the sheet when the sheet is rendered. For example, the object is stored near an upper left portion of the sheet.

Moving to decision block 855, a determination is made whether any more published objects exist in the workbook data. If any more published objects exist in the workbook data, processing proceeds to block 810. If no more published objects exist in the workbook data, processing continues at block 860.

Transitioning to block 860, the published item snapshot is saved. The published item snapshot provides information about select objects in the workbook data at a specific point in time. Some object data is not included in the published item snapshot such that users who access the published item snapshot are prevented from viewing sensitive information.

Proceeding to block 865, the spreadsheet application server converts the published item snapshot into a format that may be rendered at the client. In one embodiment, the published item snapshot is converted to a spreadsheet file format. The file is then rendered at the client. Processing then terminates at an end block.

Based on the foregoing, it should be appreciated that the various embodiments of the invention include a method, system, apparatus, and computer-readable medium for generating a snapshot of electronic data. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for generating a published snapshot of a spreadsheet having electronic file data, the method comprising:

receiving a request for the snapshot;

in response to receiving the request for the snapshot, generating the snapshot, wherein generating the snapshot includes:

retrieving the electronic file data associated with the requested snapshot, wherein the retrieved electronic file data comprises static data and dynamic data and a plurality of objects;

receiving a selection of one or more of the plurality of objects for publishing in the snapshot;

determining a current state of the dynamic data in the one or more objects selected for publishing in the snapshot, wherein determining the current state of the dynamic data comprises calculating a value for a formula in the retrieved electronic file data and refreshing data that is linked to an external data source in the retrieved electronic file data;

dissociating the value from the formula after calculating the value;

dissociating the refreshed data from the external data source such that the refreshed data in the saved snapshot does not reference the external data source;

identifying proprietary information in the one or more objects selected for publishing; and saving the snapshot, the saved snapshot comprising the one or more objects selected for publishing, the current state of the dynamic data, including the value and the dissociated refreshed data, and wherein the identified proprietary information and objects not selected for publishing are not viewable in the snapshot when the snapshot is accessed.

2. The method of claim 1, further comprising removing the identified proprietary information from the retrieved electronic file data.

3. The method of claim 1, further comprising disabling an automatic determination of the current state of the dynamic data such that the current state of the dynamic data is determined in response to a user action.

4. The method of claim 1, further comprising removing metadata associated with the retrieved electronic data such that the saved snapshot does not comprise metadata associated with the retrieved electronic data.

5. The method of claim 1, further comprising:

creating a sheet for the one or more objects selected for publishing; and copying the one or more objects selected for publishing on the sheet, wherein the snapshot comprises the sheet.

6. The method of claim 5, wherein copying the one or more objects selected for publishing further comprises copying the object on a portion of the sheet such that the one or more objects is visible on a user interface when the snapshot is rendered.

7. A system for generating a published snapshot of a spreadsheet having electronic file data, the system comprising:

a client device, wherein a request for the snapshot is generated at the client;

a data store coupled to a server device, wherein the electronic file data associated with the requested snapshot is stored in the data store; and the server device coupled to the client device and the data store, wherein the server device comprises a processor and memory and the processor and memory are communicatively arranged to generate the snapshot in response to receiving the request, wherein generating the snapshot includes:

retrieving the electronic file data associated with the requested snapshot from the data store, wherein the electronic file data comprises a plurality of objects;

receiving a selection of one or more of the plurality of objects for publishing in the snapshot;

refreshing data in the one or more objects selected for publishing in the snapshot that is linked to an external data source, wherein the refreshed data is dissociated from the external data source after refreshing such that the refreshed data does not reference the external data source;

calculating a value for a formula in the one or more objects selected for publishing in the snapshot, wherein the value is dissociated from the formula after calculating the value;

identifying proprietary information in the one or more objects selected for publishing; and saving the snapshot, the saved snapshot comprising the one or more objects selected for publishing, the calculated value, and the refreshed data, and wherein the identified proprietary information and objects not selected for publishing are not viewable in the snapshot when the snapshot is accessed.

8. The system of claim 7, wherein the server is further arranged to:

disable an automatic calculation feature associated with the value for the formula; and update the calculated value in response to a user action.

9. The system of claim 7, wherein the server is further arranged to:

disable an automatic refresh feature associated with the data that is linked to the external data source; and update the data that is linked to the external data source in response to user action.

10. The system of claim 7, wherein the server is further arranged to remove the identified proprietary information from the retrieved electronic file data.

11. A computer-readable storage medium storing computer executable instructions for generating a snapshot of electronic file data associated with a workbook, the instructions comprising:

receiving a snapshot request from a client, wherein the snapshot request includes at least one member of a group comprising: a static snapshot request, an interactive snapshot request, and a published item snapshot request;

generating a snapshot in accordance with the snapshot request, wherein generating the snapshot includes:

when the snapshot request is a static snapshot request:

retrieving workbook data associated with the static snapshot request;

refreshing link data of links to external data sources associated with the workbook data, wherein the external data sources are dissociated with the link after refreshing;

calculating any corresponding values of formulas associated with the workbook data, wherein the values are dissociated from the formulas after calculating;

removing proprietary information from the workbook data; and saving the snapshot, wherein the snapshot includes the link data dissociated from the external data source and values dissociated from the formulas;

when the snapshot request is an interactive snapshot request:

retrieving workbook data associated with the interactive snapshot request;

refreshing link data of links to external data sources associated with the workbook data, wherein the link to the external data source is maintained;

calculating any corresponding values of formulas associated with the workbook data, wherein the values are maintained in association with the formulas;

hiding proprietary information from the workbook data; and saving the snapshot, wherein the snapshot includes the link data maintained with the external data source, values maintained in association with the formulas, and proprietary information hidden in the workbook data; and when the snapshot request is a published item snapshot request:

retrieving workbook data associated with the published item snapshot request, wherein the workbook data includes a plurality of objects;

receiving a selection of one or more of the plurality of objects for publishing in the published item snapshot as one or more published objects, wherein objects for which no selection is made are excluded from the published item snapshot;

refreshing link data of links to external data sources associated with the one or more published objects, wherein the external data sources are dissociated with the link after refreshing;

calculating any corresponding values of formulas associated with the one or more published objects, wherein the values are dissociated from the formulas after calculating;

removing proprietary information from the one or more published objects; and saving the snapshot, the snapshot including the one or more published objects, the link data dissociated from the external data source and the values dissociated from the formulas, and wherein the published object includes a different location in the snapshot than in the electronic file.

12. The computer-readable storage medium of claim 11, wherein the different location in the snapshot includes a location in the snapshot where the one or more published objects is displayed within a user interface when the snapshot is opened.

* * * * *